United States Patent [19]

Shinozaki

[11] Patent Number: 5,289,098
[45] Date of Patent: Feb. 22, 1994

[54] STEPPING MOTOR DRIVER CIRCUIT
[75] Inventor: Eiji Shinozaki, Tokyo, Japan
[73] Assignee: NEC Corporation, Japan
[21] Appl. No.: 33,489
[22] Filed: Mar. 18, 1993
[30] Foreign Application Priority Data
  Mar. 19, 1992 [JP] Japan .................................. 4-62908
[51] Int. Cl.⁵ .................................. H02P 8/00
[52] U.S. Cl. .................................. 318/696; 318/685
[58] Field of Search ............... 318/685, 696, 254, 138, 318/439

[56] References Cited
U.S. PATENT DOCUMENTS

| | | | |
|---|---|---|---|
| 3,577,176 | 5/1971 | Kreithen et al. | 318/432 |
| 3,728,598 | 4/1973 | May | 318/696 |
| 3,842,332 | 10/1974 | Heine et al. | 318/696 |
| 4,035,708 | 7/1977 | Schaff | 318/696 |
| 4,100,471 | 7/1978 | Pritchard | 318/685 |
| 4,584,506 | 4/1986 | Kaszmann | 318/254 |
| 4,587,473 | 5/1986 | Turvey | 318/696 |
| 4,803,415 | 2/1989 | Sepsey | 318/696 |

Primary Examiner—Jonathan Wysocki
Attorney, Agent, or Firm—Ostrolenk, Faber, Gerb & Soffen

[57] ABSTRACT

A stepping motor driver circuit first and second push-pull circuits having first and second output terminals, respectively, first and second driving circuits for driving the first and second push-pull circuits in opposite phases relative to each other, respectively, and first and second holding circuits for driving the first and second push-pull circuits, respectively, so that the output voltage between the first and second output terminals may be reduced to a predetermined holding voltage when a predetermined load is held. Here, each of the first and second holding circuits includes a constant-current source for setting a predetermined constant current, a constant-voltage source for supplying a predetermined reference voltage to set the holding voltage, and an amplifier circuit of the current feedback type for inputting the reference voltage and operating with the constant current.

5 Claims, 5 Drawing Sheets

STEPPING MOTOR DRIVER CIRCUIT

BACKGROUND OF THE INVENTION

1. Field of the Invention

This invention relates to a stepping motor driver circuit, and more particularly to a stepping motor driver circuit with a power saving function for use with a disk drive unit of a floppy disk apparatus of an information processing system or a like apparatus.

2. Description of the Prior Art

When a stepping motor operates in a stepping operation, high torque is required, and consequently, high driving current is required. However, when the stepping motor is in holding mode, high torque is not required, and accordingly, the driving current can be reduced. Therefore, it is a common practice to provide a stepping motor driver circuit with a power saving function so that excessive current will not be supplied to the stepping motor when the stepping motor is in holding mode.

A conventional stepping motor driver circuit of the type mentioned is constituted from, as shown in FIG. 1, a bridge circuit 3 for a driving coil 4 of a stepping motor, inverters I1 to I3 constituting a driving circuit for the driving bridge circuit 3, and a pair of holding circuits 5 and 6 for setting the holding current at a lower level than the operating current of the stepping motor when the stepping motor is in holding mode.

The bridge circuit 3 is constituted from one push-pull circuit 31 constituted from a P-channel MOS transistor P31 and an N-channel MOS transistor N31 connected in series to each other between a power source VD and a ground VS and having output O1 at the mid-point between them, and another push-pull circuit 32 constituted from a P-channel MOS transistor P32 and an N-channel MOS transistor N32 connected in series to each other between the power source VD and the ground VS and having an output O2 at the midpoint between them, similar to the other push-pull circuit 31.

Inverters I1 and I2, which have the same polarity as input IN, drive push-pull circuit 31, and inverter I3, which has the opposite polarity to input IN, drives push-pull circuit 32.

Holding circuit 5 is constituted from an operational amplifier A51, a reference voltage source VR51 of voltage vR, and a switch circuit S51. Similarly, holding circuit 6 is constituted from an operational amplifier A61, a reference voltage source VR61 of voltage vR, and a switch circuit S61.

Switch circuit S51 selects contact b when the stepping motor is in ordinary operating mode, in which high torque is required, or when input IN is at an "H" (high) level, but it selects the other contact a when the stepping motor is in holding mode and input IN is at an "L" (low) level. On the other hand, switch circuit S61 selects contact b when the stepping motor is in ordinary operating mode, in which high torque is required, or when input IN is at an "L" level, but it selects the other contact a when the stepping motor is in holding mode and input IN is at an "H" level.

Since the stepping motor actually has two coils, it is provided with two similar driving circuits which drive it stepwise in synchronism with each other.

Operation of the conventional stepping motor driver circuit is described below.

First, ordinary operation is described. In this instance, switch circuits S51 and S61 both select contacts b. Accordingly, the gates of transistors P31 and N31 and the gates of transistors P32 and N32 of push-pull circuits 31 and 32 are connected in common to each other. When input IN is at an "H" level, the output of inverter I2 presents an "H" level while the output of inverter I3 presents an "L" level. Consequently, transistors N31 and P32 are ON, and transistors N32 and P31 are OFF. Accordingly, the output O2 of push-pull circuit 32 applied to coil 4 is voltage vD of power source VD, and the output O1 of push-pull circuit 31 is voltage vS of ground VS. As a result, the load current $iD=vD/R$, which depends upon the direct current resistance R of coil 4, flows from the output O2 side to the output O1 side through coil 4. In this instance, since the on-resistances of transistors N1 and P32 are low, they are ignored and regarded as equal to 0.

Next, when input IN changes to an "L" level, the output of inverter I2 is changed to an "L" level while the output of inverter I3 is changed to an "H" level, and consequently, transistors N31 and P32 are turned OFF and transistors N32 and P31 are turned ON. Accordingly, output O1 of push-pull circuit 31 applied to coil 4 is voltage Vd of power source VD, and output O2 of push-pull circuit 32 is voltage vS of ground VS. As a result, conversely to the case described above, load current iD flows from the output O1 side to the output O2 side through coil 4.

Operation of the stepping motor in holding mode (power saving mode) will next be described. The negative input of operational amplifier A51 is connected to reference power source VR51 while the positive input is connected to the output O1 of push-pull circuit 31, and the output of operational amplifier A51 is connected to the gate of transistor P31 of push-pull circuit 31 via contact a of switch circuit S51. Similarly, the negative input of operational amplifier A61 is connected to reference power source VR61 while the positive input is connected to the output O2 of push-pull circuit 32, and the output of operational amplifier A61 is connected to the gate of transistor P32 of push-pull circuit 32 via contact a of switch circuit S61.

First, when the stepping motor is in holding mode and input IN is at an "L" level, switch circuit S51 selects contact a and switch circuit S61 selects contact b. Further, since the output of inverter I2 presents an "L" level while the output of inverter I3 presents an "H" level, transistors N31 and P32 are OFF and transistors P31 and N32 are ON. Accordingly, the output O2 of push-pull circuit 32 is voltage vS of ground vS. Negative feedback is applied to transistor P31 by operational amplifier A51, and accordingly, the output O1 of push-pull circuit 31 presents the equal potential to reference voltage vR. Accordingly, the voltage applied across coil 4 of the stepping motor is reference voltage vR. As a result, current iH flowing through coil 4 is $iH=vR/R$. Accordingly, power consumption can be reduced by $vD\times(vD/R - vR/R)$ as compared with power consumption when the stepping motor is in operating mode.

FIG. 2 is a circuit diagram showing an example of a configuration of operational amplifiers A51 and A52. As shown in FIG. 2, each of operational amplifiers A51 and A52 is a voltage feedback amplifier constituted from a differential amplifier, a pair of output buffer amplifiers for a differential pair of the differential amplifier, a constant-current source for the differential amplifier and the buffer amplifiers, and some other elements, and employs a total of eleven transistors N51 to N56 and P51 to P55.

The conventional stepping motor driver circuit described above is disadvantageous in that, since it employs an operational amplifier of the voltage feedback type which includes a comparatively large number of component elements such as transistors, it is large in pellet size and high in cost when it is constituted into a semiconductor integrated circuit.

SUMMARY OF THE INVENTION

It is an object of the present invention to provide a stepping motor driver circuit wherein the number of component elements is reduced significantly and the pellet size is small when it is constituted into an integrated circuit.

Other features and advantages of the invention will be apparent from the following description taken in conjunction with the accompanying drawings.

DESCRIPTION OF THE PREFERRED EMBODIMENTS

The first embodiment of the present invention is described with reference to FIGS. 3 and 4.

Figure 1:
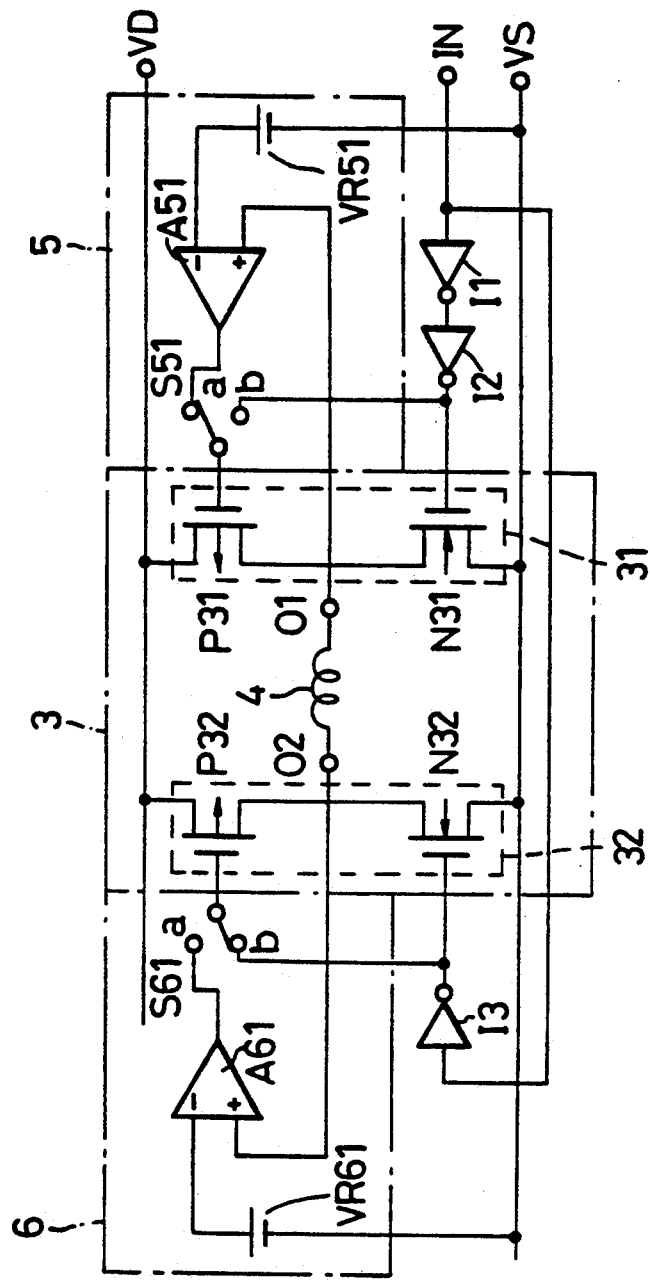
FIG. 1 is a circuit diagram showing an example of a conventional stepping motor driver circuit.
Figure 2:
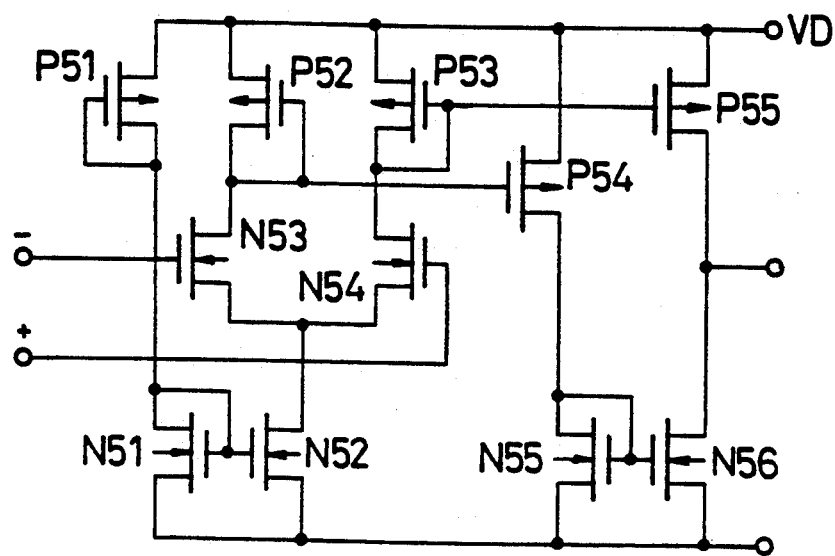
FIG. 2 is a circuit diagram showing an example of the configuration of operational amplifiers A51 and A52.
Figure 3:
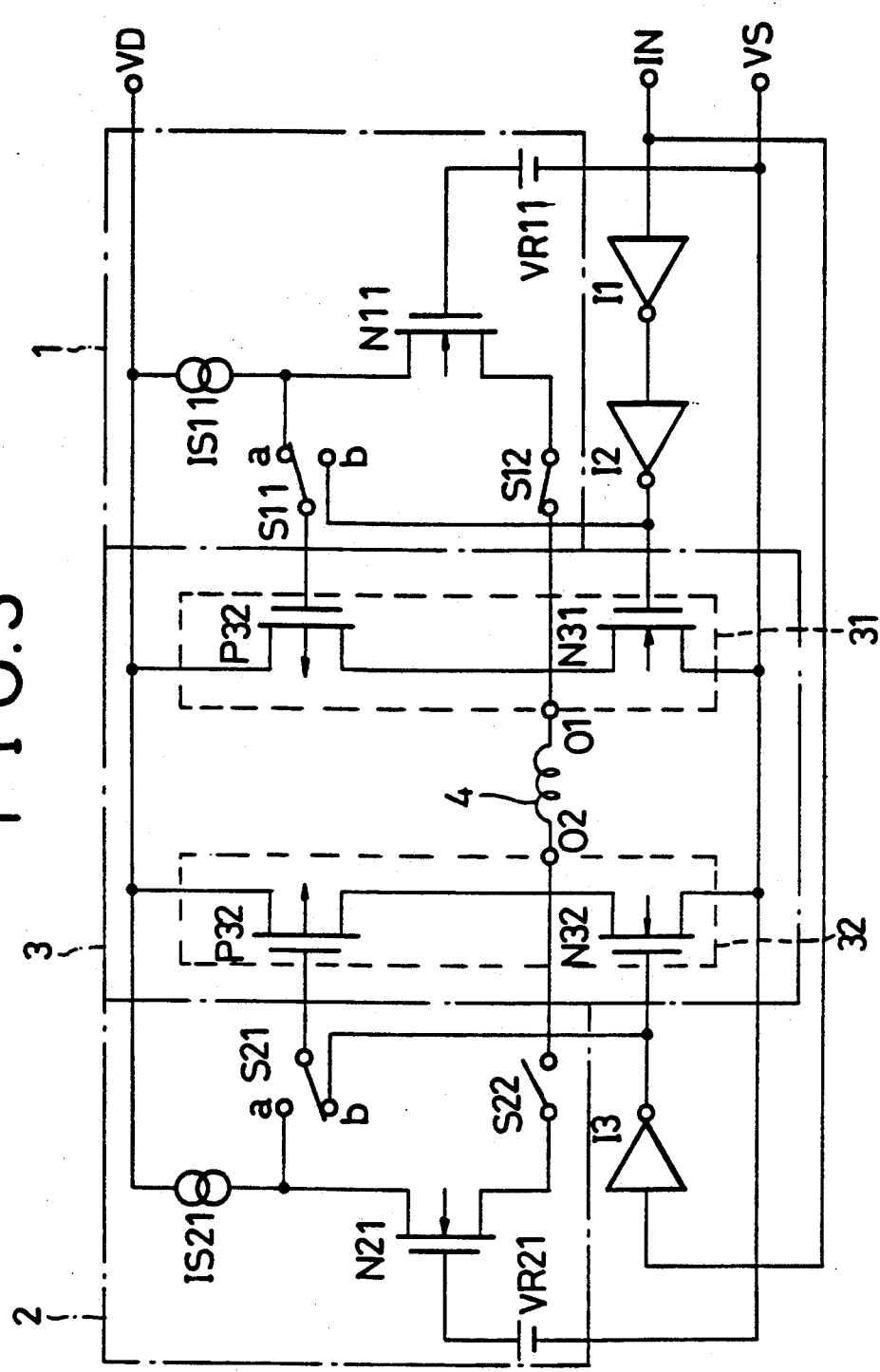
FIG. 3 is a circuit diagram showing a first embodiment of a stepping motor driver circuit of the present invention.

The stepping motor driver circuit of the present embodiment is constituted from, as shown in FIG. 3, a bridge circuit 3 for driving the coil 4 of a stepping motor and inverters I1 to I3, which are similar to those of the conventional circuit of FIG. 1, and a pair of holding circuits 1 and 2 provided in place of holding circuits 5 and 6 of the conventional circuit.

The bridge circuit 3 is constituted from push-pull circuit 31 constituted from a P-channel MOS transistor P31 and an N-channel MOS transistor N31 connected in series to each other and having an output O1 at the mid-point between them, and another push-pull circuit 32 constituted from a pair of transistors P32 and N32 connected in series to each other and having an output O2 at the mid-point between them, similar to the other push-pull circuit 31.

Holding circuit 1 is constituted from an N-channel MOS transistor N11, a reference voltage source VR11 of voltage vR, a constant-current source IS11 of current value i, and a pair of switch circuits S11 and S12. Holding circuit 2 is constituted from an N-channel MOS transistor N21, a reference voltage source VR21 of voltage vR, a constant-current source IS21 of current value i, and a pair of switch circuits S21 and S22.

Switch circuits S11, S12, S21 and S22 are each in the form of an analog switch such as a transfer gate. Switch circuit S11 selects contact b when the stepping motor is in ordinary operating mode, in which high torque is required and input IN is at an "H" level, but selects the other contact a when the stepping motor is in holding mode and input IN is at an "L" level. When switch circuit S11 selects contact a, switch S12 connects the source of transistor N11 to the output O1 of push-pull circuit 31, but opens it when switch circuit S11 selects the other contact b. Meanwhile, switch circuit S21 selects contact b when the stepping motor is in ordinary operating mode, in which high torque is required and input IN is at an "L" level, but selects the other contact a when the stepping motor is in holding mode and input IN is at an "H" level. When switch circuit S21 selects contact a, switch circuit S22 connects the source of transistor N21 to the output O2 of push-pull circuit 32, but opens it when switch circuit S21 selects the other contact b.

Since the stepping motor actually has two coils, it is provided with two similar driver circuits for driving it stepwise in synchronism with each other.

Next, the operation of the stepping motor driver circuit of the present embodiment will be described.

First, ordinary operation is described. In this instance, switch circuits S11 and S21 select contacts b. Accordingly, the gates of transistors P31 and N31 of push-pull circuit 31 are connected in common to each other and the gates of transistors P32 and N32 of push-pull circuit 32 are connected in common to each other. Accordingly, the operation in this instance is the same as that of the example of the prior art described above, and a redundant description of it is here omitted.

Next, the operation of the stepping motor in holding mode (power saving mode) is described. Here, it is assumed that input IN is at an "L" level. In this instance, switch circuit S11 selects contact a while switch circuit S12 selects contact b as described above. Switch S12 is closed while switch S22 is open. Further, since the output of inverter I2 presents an "L" level while the output of inverter I3 presents an "H" level, transistors N31 and P32 are OFF and transistors P31 and N32 are ON. Accordingly, voltage vO2 of the output O2 of push-pull circuit 32 is equal to the voltage vS of ground vS. Further, the potential of the gate of transistor N11 of holding circuit 1 is equal to the reference voltage vR of the reference voltage source VR, and accordingly, voltage VO1 of the output O1 of push-pull circuit 31 is represented by the following equation using reference voltage vR and the current value i of constant-current source IS11:

$$vO1 = vR - VT - \sqrt{2i/\beta} \tag{1}$$

where $\beta$ and VT are a gain coefficient and a threshold voltage level of transistor N11, respectively.

Accordingly, power P given by the following equation can be saved similarly as in the conventional example described above:

$$P = vD \times \{vD/R - (vR - VT - \sqrt{2i/\beta})/R\}$$

Figure 4:
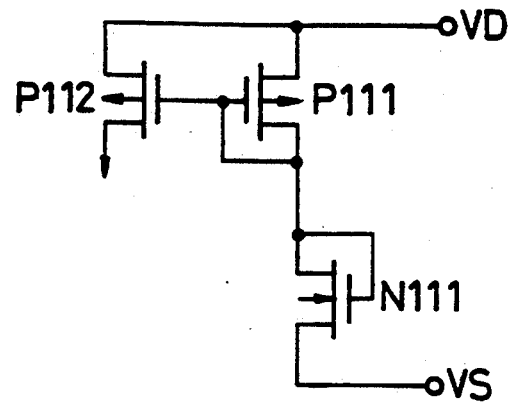
FIG. 4 is a circuit diagram showing an example of constant-current sources IS11 and IS21.

FIG. 4 is a circuit diagram showing an example of the configuration of constant-current sources IS11 and IS21. As shown in FIG. 4, each of constant-current courses IS11 and IS21 can be constituted from a pair of P-channel MOS transistors P111 and P112 which form a current mirror circuit, and N-channel MOS transistor N111 constituting the current source for P-channel MOS transistors P111 and P112.

Figure 5:
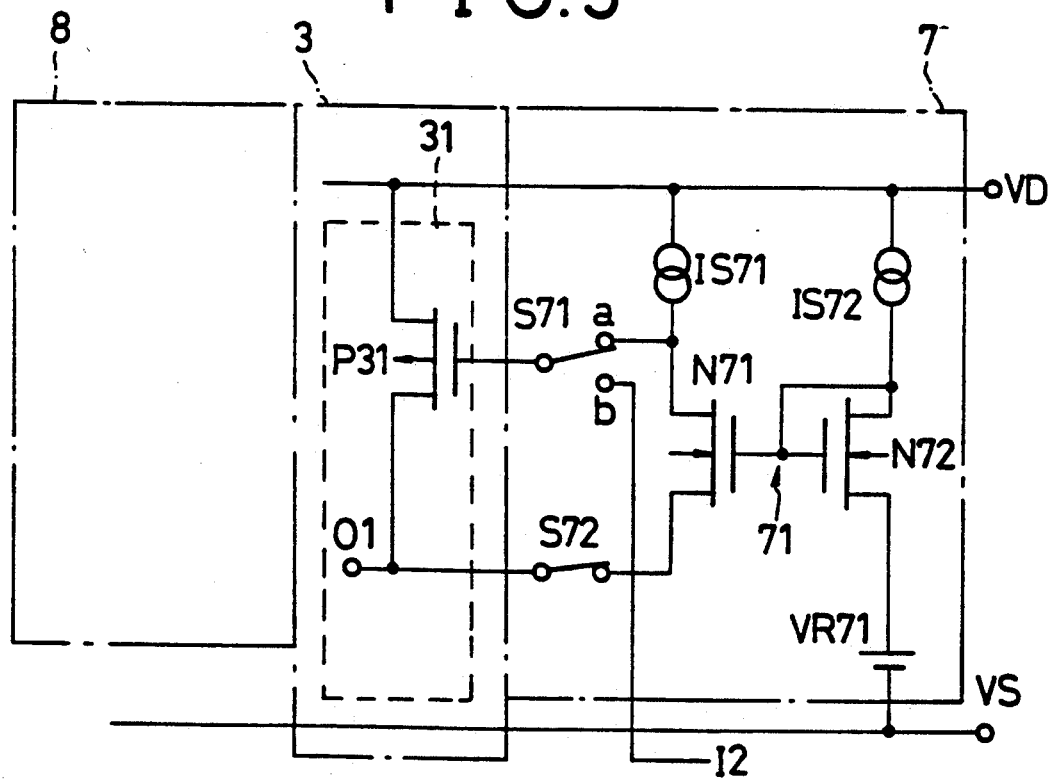
FIG. 5 is a circuit diagram showing a second embodiment of a stepping motor driver circuit of the present invention.

Next, the second embodiment of the present invention will be described with reference to FIG. 5.

The difference between the stepping motor driver circuit of the present embodiment and the stepping motor driver circuit of the first embodiment described above resides in that it includes a pair of holding circuits 7 and 8 in place of holding circuits 1 and 2 shown in FIG. 3. The other part of the configuration is common to that of the first embodiment described above, and a redundant description of it is here omitted.

Holding circuits 7 and 8 are the same circuit, and holding circuit 7 is constituted from current mirror circuit 71 constituted from a pair of N-channel MOS transistors N71 and N72, a pair of current sources IS71 and IS72 of current i for transistors N71 and N72 of current mirror circuit 71, respectively, reference voltage source VR71 of reference voltage vR, and a pair of switch circuits S71 and S72. Holding circuit 8 is constituted from similar component elements having reference characters each having reference numeral 8 in place of 7.

Switch circuits S71, S72, S81 and S82 have the same functions as those of switch circuits S11, S12, S21 and S22 in the first embodiment.

The operation of the stepping motor driver circuit of the present embodiment is described below.

In the first embodiment described above, voltage vO1 of the output O1 of push-pull circuit 31 and voltage vR11 of reference voltage source VR11 are different from each other as seen from equation (1) above. In the present embodiment, in order to make the two voltages equal, current mirror circuit 71 is constituted from transistor N71 (corresponding to transistor N11 in the first embodiment) and transistor N72 having the same size, and constant-current source IS72 equivalent to constant-current source IS71 is added as the current source for transistor N72.

As is well known in the art, since current values to transistors N71 and N72 constituting current mirror circuit 71 are equal, their gate-source voltages are also equal. Accordingly, voltage vO1 of the output O1 of push-pull circuit 31 and voltage vR71 of the reference voltage source VR71 are equal.

The relationship described above can be established even when transistors N71 and N72 are different from each other in size by making equal the ratio between the currents of constant-current sources IS71 and IS72 and the ratio between the sizes of transistors N71 and N72.

Next, the third embodiment of the present invention will be described with reference to FIG. 6.

Figure 6:
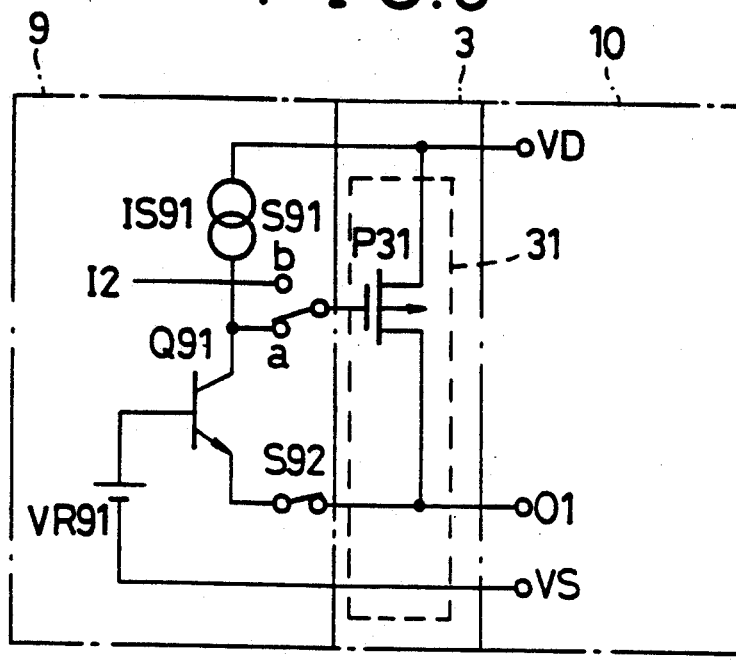
FIG. 6 is a circuit diagram showing a third embodiment of a stepping motor driver circuit of the present invention.

The difference between the stepping motor driver circuit of the present embodiment shown in FIG. 6 and the stepping motor driver circuit of the first embodiment described above resides in that it includes a pair of holding circuits 9 and 10 in place of holding circuits 1 and 2 shown in FIG. 3. The other parts of the configuration are common to that of the first embodiment described above, and a redundant description will here be omitted.

Holding circuits 9 and 10 are the same, and holding circuit 9 includes an NPN bipolar transistor Q91 in place of the N-channel MOS transistor N11 of the first embodiment and further includes a reference voltage source VR91 of voltage vR, a constant-current source IS91 of current value i, and a pair of switch circuits S91 and S92, which are similar to those in the first embodiment. Holding circuit 10 is constituted from similar component elements having reference characters each having reference numeral 10 in place of 9.

Switch circuits S91, S92, S101 and S102 have the same functions as switch circuits S11, S12, S21 and S22 in the first embodiment.

Next will be described the operation of the stepping motor driver circuit of the present embodiment.

The operation of the stepping motor in holding mode (power saving mode) is described. Here, it is assumed that input IN is at an "L" level, as in the first and second embodiments. In this instance, voltage vO1 of the output O1 of push-pull circuit 31 is represented by the following equation:

$$vO1 = vR - VT \ln i/IS \tag{2}$$

where IS and VT are a saturation current and a threshold voltage level of transistor Q91, respectively.

The second term of equation (2) represents the base-emitter voltage of transistor Q91, and since the value is 0.7 V commonly, voltage vO1 is given by the following equation:

$$VO1 = vR - 0.7$$

Accordingly, the power P given by the following equation can be saved:

$$P = vD \times 1/R \, (vD - vR + 0.7)$$

The fourth embodiment of the present invention will next be described with reference to FIG. 7.

Figure 7:
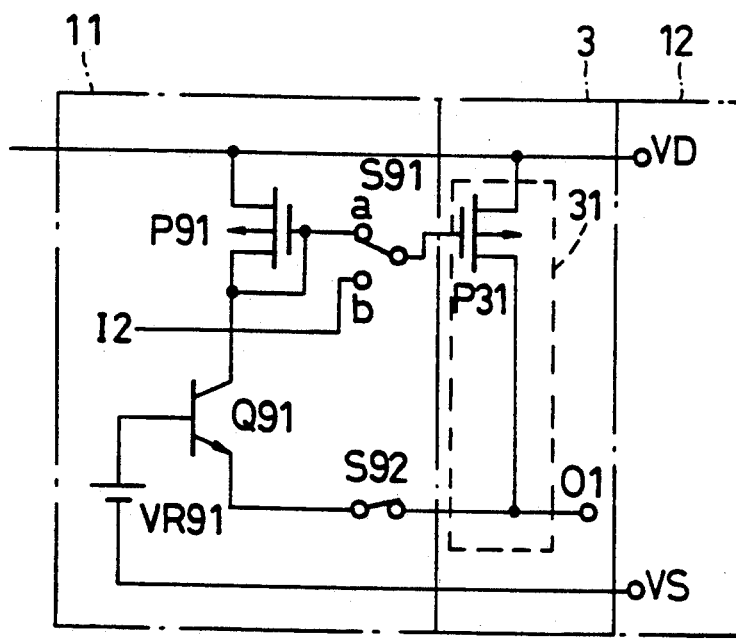
FIG. 7 is a circuit diagram showing a fourth embodiment of a stepping motor driver circuit of the present invention.

The difference between the stepping motor driver circuit of the present embodiment shown in FIG. 7 and the stepping motor driver circuit of the third embodiment described above resides in that it includes a pair of holding circuits 11 and 12 in place of holding circuits 9 and 10 shown in FIG. 6. The other part of the configuration is common to that of the third embodiment described above, and a redundant description will here be omitted.

Each of the holding circuits 11 and 12 of the present embodiment includes a P-channel MOS transistor P91 in place of the constant-current source IS91 of the third embodiment shown in FIG. 6, and a current mirror circuit is constituted from this transistor P91 and transistor P31 of push-pull circuit 31.

The operation of the stepping motor driver circuit of the present embodiment is described below.

The operation of the stepping motor in holding mode (power saving mode) is described. In this instance, switch circuit S91 selects contact a to connect the gates of transistors P91 and P31 in common to each other. Meanwhile, switch circuit S92 is closed. Since the base potential of transistor Q91 is equal to voltage vR of reference voltage source VR, voltage vO1 of the output O1 of push-pull circuit 31 presents, as described above, a value given by the following equation:

$$VO1 = vR - 0.7$$

As an example, when the current ratio of the current mirror circuit by transistors P31 and P91 is 9:1, 90% of the output current of output O1 is outputted from transistor P31 while 10% of the output current is outputted from transistor P91. Since the load current of transistor P91 is low as described above, the size of transistor P91 may be small.

It is to be understood that the present invention is not limited to the specific embodiments described above and that various modifications can be made without departing from the scope of the claims. For example, it is naturally possible to exchange N-channel MOS transistors and P-channel MOS transistors or exchange an NPN transistor and a PNP transistor without departing from the spirit and scope of the present invention.

What is claimed is:

1. A stepping motor driver circuit, comprising:
   a first push-pull circuit including first and second transistors of the first and the second conduction types, respectively, connected in series and having a first output terminal at the mid-point between said first and second transistors;
   a second push-pull circuit including third and fourth transistors of the first and the second conduction types, respectively, connected in series and having a second output terminal at the mid-point between said third and fourth transistors;
   first and second driving circuits for driving said first and second push-pull circuits in opposite phases relative to each other, respectively; and
   first and second holding circuits each including a first constant-current source for setting a predetermined constant current, a constant-voltage source for supplying a predetermined reference voltage to set a holding voltage, and an amplifier circuit of the current feedback type for inputting the reference voltage and operating with the constant current, said first and second holding circuits driving said first and second push-pull circuits, respectively, so that the output voltage between said first and second output terminals may be reduced to the holding voltage when a predetermined load is held.

2. A stepping motor driver circuit as claimed in claim 1, wherein said amplifier circuit includes a MOS transistor of the second conduction type, of which the drain is connected to said first constant-current source, the gate is connected to said constant-voltage source, and the source is connected to a corresponding one of said first and second output terminals.

3. A stepping motor driver circuit as claimed in claim 1, wherein said amplifier circuit includes a first MOS transistor of the second conduction type, of which the drain is connected to said first constant-current source and the source is connected to a corresponding one of said first and second output terminals, a second constant-current source, and a second MOS transistor of the second conduction type, of which the drain nd the gate are connected in common to each other and to said second constant-current source and the gate of said first MOS transistor and the source is connected to said constant-voltage source.

4. A stepping motor driver circuit as claimed in claim 1, wherein said amplifier circuit includes a bipolar transistor of which the collector is connected to said first constant-current source, the base is connected to said constant-voltage source and the emitter is connected to a corresponding one of said first and second output terminals.

5. A stepping motor driver circuit as claimed in claim 4, wherein said first constant-current source includes a third MOS transistor of the first conduction type, of which the drain and the gate are connected in common to each other at a junction connected to the gate of said first transistor so that said third MOS transistor forms a current mirror circuit together with said first transistor and supplies the constant current to said amplifier circuit.

* * * * *